United States Patent
Aminaka et al.

(10) Patent No.: US 9,549,415 B2
(45) Date of Patent: Jan. 17, 2017

(54) RADIO STATION AND METHOD OF PROCESSING USER DATA WITH RADIO STATION

(71) Applicants: Hiroaki Aminaka, Tokyo (JP); Kojiro Hamabe, Tokyo (JP)

(72) Inventors: Hiroaki Aminaka, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/360,917

(22) PCT Filed: Oct. 3, 2012

(86) PCT No.: PCT/JP2012/006367
§ 371 (c)(1),
(2) Date: May 27, 2014

(87) PCT Pub. No.: WO2013/076901
PCT Pub. Date: May 30, 2013

(65) Prior Publication Data
US 2014/0334417 A1    Nov. 13, 2014

(30) Foreign Application Priority Data

Nov. 25, 2011    (JP) .................................. 2011-257476

(51) Int. Cl.
*H04W 72/12*    (2009.01)
*H04W 28/02*    (2009.01)
(Continued)

(52) U.S. Cl.
CPC ................ *H04W 72/12* (2013.01); *H04L 1/00* (2013.01); *H04W 88/085* (2013.01);
(Continued)

(58) Field of Classification Search
CPC ............... H04W 72/12; H04W 28/205; H04W 52/0261; H04W 24/10; H04W 92/12; H04W 88/08; H04W 72/005; H04W 72/1257
See application file for complete search history.

(56) References Cited

U.S. PATENT DOCUMENTS 8,050,296 B2 *    11/2011    Osterling ............... H04J 3/0638
370/278
2003/0189915 A1    10/2003    Miller
(Continued)

FOREIGN PATENT DOCUMENTS

CN    102158461 A    8/2011
EP    1713290 A1    10/2006
(Continued)

OTHER PUBLICATIONS

Ericsson AB, Huawei Technologies Co. Ltd, NEC Corporation, Alcatel Lucent and Nokia Siemens Networks GmbH & Co. KG, Common Public Radio Interface (CPRI); Interface Specification, V5.0 (Sep. 21, 2011), p. 5.*
(Continued)

*Primary Examiner* — Chi H Pham
*Assistant Examiner* — Shailendra Kumar
(74) *Attorney, Agent, or Firm* — Wilmer Cutler Pickering Hale and Dorr LLP

(57) ABSTRACT

A radio station (1) includes a first part (1A) and at least one second part (1B). The second part (1B) can be arranged so as to be physically separated from the first part (1A) and is connected to the first part (1A) via a transmission line (40) so as to be able to communicate with the first part (1A). The first part (1A) includes a bearer termination unit (10) capable of terminating at least one bearer between an upper network and the radio station (1). The second part (1B) includes a physical layer signal processing unit (12) that performs
(Continued)

physical layer signal processing. The physical layer signal processing includes channel coding and decoding for user data pertaining to a first mobile station connected to the second part (1B) among a plurality of mobile stations.

21 Claims, 11 Drawing Sheets

(51) Int. Cl.
*H04L 1/00* (2006.01)
*H04W 52/02* (2009.01)
*H04W 72/00* (2009.01)
*H04W 88/08* (2009.01)
*H04W 92/12* (2009.01)
*H04L 1/18* (2006.01)

(52) U.S. Cl.
CPC ....... *H04L 1/1887* (2013.01); *H04W 28/0205* (2013.01); *H04W 52/0261* (2013.01); *H04W 72/005* (2013.01); *H04W 72/1257* (2013.01); *H04W 88/08* (2013.01); *H04W 92/12* (2013.01)

(56) References Cited

U.S. PATENT DOCUMENTS

| | | | |
|---|---|---|---|
| 2005/0047335 A1 | 3/2005 | Cheng et al. | |
| 2005/0096054 A1 | 5/2005 | Zhang et al. | |
| 2005/0141477 A1 | 6/2005 | Tomita et al. | |
| 2005/0255823 A1 | 11/2005 | Zhang et al. | |
| 2006/0142021 A1 | 6/2006 | Mueckenheim et al. | |
| 2006/0251030 A1 | 11/2006 | Anderson et al. | |
| 2007/0073895 A1 | 3/2007 | Sebire et al. | |
| 2007/0184840 A1 | 8/2007 | Zhang et al. | |
| 2008/0101257 A1 | 5/2008 | Cheng et al. | |
| 2010/0195544 A1 | 8/2010 | Anderson et al. | |
| 2011/0065396 A1* | 3/2011 | Hirata ............... | H04W 52/0261 455/77 |
| 2011/0128950 A1* | 6/2011 | Tomita ................ | H04W 92/12 370/339 |
| 2011/0158332 A1* | 6/2011 | Wu ....................... | H04W 88/08 375/259 |
| 2011/0171944 A1 | 7/2011 | Kobayashi et al. | |
| 2011/0235564 A1* | 9/2011 | Watanabe ............ | H04W 72/005 370/312 |
| 2012/0057548 A1 | 3/2012 | Hasegawa | |
| 2012/0263068 A1* | 10/2012 | Morimoto ............ | H04W 24/10 370/252 |
| 2013/0017852 A1* | 1/2013 | Liu ...................... | H04W 88/085 455/509 |
| 2013/0272213 A1* | 10/2013 | Manssour ........... | H04W 72/121 370/329 |
| 2013/0329698 A1 | 12/2013 | Miller | |

FOREIGN PATENT DOCUMENTS

| | | |
|---|---|---|
| EP | 1677564 B1 | 1/2008 |
| EP | 1880566 B1 | 8/2009 |
| EP | 2299758 A2 | 3/2011 |
| EP | 1545143 B1 | 6/2011 |
| EP | 1680865 B1 | 6/2011 |
| EP | 2328382 A1 | 6/2011 |
| EP | 2373069 A2 | 10/2011 |
| EP | 2479929 A1 | 7/2012 |
| EP | 2525623 A2 | 11/2012 |
| EP | 2672743 A1 | 12/2013 |
| JP | 2005-057561 A | 3/2005 |
| JP | 2006-191592 A | 7/2006 |
| JP | 2007-503173 A | 2/2007 |
| JP | 2007-511136 A | 4/2007 |
| JP | 2008/099306 * | 4/2008 |
| JP | 2008-099306 A | 4/2008 |
| JP | 2008-541523 A | 11/2008 |
| JP | 2009-510874 A | 3/2009 |
| JP | 2010-74755 A | 4/2010 |
| JP | 2011-066593 A | 3/2011 |
| JP | 2011-515895 A | 5/2011 |
| JP | 2011-114689 A | 6/2011 |
| JP | 2011-142516 A | 7/2011 |
| JP | 2011-193072 A | 9/2011 |
| JP | 2011-211325 A | 10/2011 |
| WO | WO-2004/030396 A1 | 4/2004 |
| WO | WO-2004/095861 A1 | 11/2004 |
| WO | WO-2005/020597 A2 | 3/2005 |
| WO | WO-2005/048465 A2 | 5/2005 |
| WO | WO-2006/117251 A1 | 11/2006 |
| WO | WO-2007/036790 A1 | 4/2007 |
| WO | WO-2010/038287 A1 | 4/2010 |
| WO | WO-2011/004645 A1 | 1/2011 |
| WO | WO-2011/083797 A1 | 7/2011 |
| WO | WO-2011/111106 A1 | 9/2011 |
| WO | WO-2011/127855 A2 | 10/2011 |

OTHER PUBLICATIONS

"CPRI Specification V5.0 (Sep. 21, 2011). Common Public Radio Interface (CPRI), Interface Specification," Ericsson AB, Huawei Technologies Co. Ltd, NEC Corporation, Alcatel Lucent and Nokia Siemens Networks GmbH & Co. KG, pp. 1-119 (Sep. 21, 2011).
CHTTL, HTC et al., "Views on heterogeneous deployment scenarios with distributed RRHs," 3GPP TSG RAN WG1 Meeting #64, R1-111006, Taipei, Taiwan, 3 pages (Feb. 21-25, 2011).
Common Public Radio Interface (CPRI) Specification V4.2 (Sep. 29, 2010), [online], Sep. 2010, Ericsson AB, Huawei Technologies Co. Ltd, NEC Corporation, Alcatel Lucent and Nokia Siemens Networks GmbH & CO. Kg, [retrieved on Oct. 20, 2011], Internet <URL:http://www.cpri.info/spec.html> ( pp. 1-113).
International Search Report corresponding to International Application No. PCT/JP2012/006365, Dec. 18, 2012, 2 pages.
International Search Report corresponding to International Application No. PCT/JP2012/006366, Dec. 18, 2012, 2 pages.
International Search Report corresponding to International Application No. PCT/JP2012/006367, Dec. 18, 2012, 2 pages.
International Search Report corresponding to International Application No. PCT/JP2012/006346, Jan. 15, 2013, 3 pages.
Extended European Search Report corresponding to European Application No. 12851052.6, dated Jul. 23, 2015, 6 pages.
Extended European Search Report corresponding to European Application No. 12851142.5, dated Aug. 12, 2015, 7 pages.
Extended European Search Report issued by the European Patent Office for Application No. 12851877.6 dated Sep. 28, 2015 (7 pages).
Japanese Decision to Grant a Patent issued in corresponding Japanese Patent Application No. 2013-545760, mail date Nov. 29, 2016, 5 pages.
Japanese Notification of Reasons for Refusal issued in corresponding Japanese Patent Application No. 2013-545758, mail date Dec. 6, 2016, 14 pages.
Japanese Notification of Reasons for Refusal issued in corresponding Japanese Patent Application No. 2013-545759, mail date Nov. 29, 2016, 10 pages.
Japanese Notification of Reasons for Refusal issued in corresponding Japanese Patent Application No. 2013-545761, mail date Nov. 29, 2016, 9 pages.
MediaTek, Inc. "Simulation Evaluation for CoMP Scenarios 3 and 4", 3GPP TSG-RAN WG1 #65, R1-111528, Barcelona, Spain, May 9-13, 2011, 6 pages.
Qualcomm Incorporated "Leveraging the Existing X2 Interface in HetNet CoMP Deployments", 3GPP TSG-RAN #66, R1-112548, Aug. 22-26, 2011, Athens, Greece, 3 pages.
Qualcomm Incorporated "Phase 2 Evaluation Results for HetNet CoMP Scenarios", 3GPP TSG-RAN WG1 #66, R1-112544, Aug. 22-26, 2011, Athens, Greece, 9 pages.

* cited by examiner

RADIO STATION AND METHOD OF PROCESSING USER DATA WITH RADIO STATION

CROSS-REFERENCE TO RELATED APPLICATIONS

This application is a national stage application of International Application No. PCT/JP2012/006367 entitled "Wireless Station and Method of Processing User Data with Wireless Station," filed on Oct. 3, 2012, which claims the benefit of the priority of Japanese Patent Application No. 2011-257476, filed on Nov. 25, 2011, the disclosures of each of which are hereby incorporated by reference in their entirety.

TECHNICAL FIELD

The present invention relates to a configuration of a radio station (e.g., a radio base station, a relay station) used in a radio communication network.

BACKGROUND ART

A structure of a radio base station including a radio equipment controller (REC) and a radio equipment (RE), which are separated from each other, is disclosed in Patent Literature 1 and Non-Patent Literature 1. The REC and the RE are at least functionally separated from each other. The REC and the RE are connected to each other through an internal interface (communication interface) of the radio base station. The REC and the RE may be arranged so as to be physically spaced apart from each other. In a typical layout, the REC is arranged in a main building of a telecom carrier and the RE is arranged at a remote location near an antenna.

The REC is connected to an upper network (e.g., a core network of a telecom carrier). The REC plays a role in controlling and monitoring the entire radio base station and performing digital baseband signal processing. In this case, the digital baseband signal processing includes layer-2 signal processing and layer-1 (physical layer) signal processing. The layer-2 signal processing includes at least one of (i) data compression/de-compression, (ii) data encryption, (iii) addition/removal of a layer-2 header, (iv) data segmentation/concatenation, and (v) composition/decomposition of a transfer format by data multiplexing/de-multiplexing. In the case of E-UTRA, as a specific example, the layer-2 signal processing includes processing of Radio Link Control (RLC) and Media Access Control (MAC). The physical layer signal processing includes channel coding/decoding, modulation/demodulation, spreading/de-spreading, resource mapping, and generation of OFDM symbol data (baseband OFDM signal) by Inverse Fast Fourier Transform (IFFT).

The RE plays a role in performing analog radio frequency (RF) signal processing, and provides an air interface to a mobile station. The analog radio frequency (RF) signal processing includes D/A conversion, A/D conversion, frequency up-conversion, frequency down-conversion, and amplification. The RE is also referred to as a remote radio head (RRH).

For example, in the case of a radio access network of a universal mobile telecommunications system (UMTS), the REC provides a connection to a radio network controller (RNC) using an Iub interface for sending and receiving user data (user plane data) and control data (control plane data). On the other hand, the RE provides a mobile station with an air interface called a Uu interface.

In the case of Evolved Universal Terrestrial Radio Access (E-UTRA), the REC provides a connection to an evolved packet core (EPC) using an S1 interface for sending and receiving user data and control data. On the other hand, the RE provides a mobile station with an air interface called an LTE-Uu interface.

As described above, the separated structure of the radio base station disclosed in Patent Literature 1 and Non-Patent Literature 1 is characterized in that a part that performs analog RF signal processing is separated as the RE. This separated structure makes it possible to flexibly and effectively deal with an increase and a change in the functions implemented in the radio base station. In addition, this separated structure makes it possible to easily deal with independent advancement of an analog RF technique and a digital baseband technique by separating the two techniques.

CITATION LIST

Patent Literature

Patent literature 1: International Patent Publication No. WO 2004/095861

Non-Patent Literature

Non-Patent literature 1: Common Public Radio Interface (CPRI) Specification V4.2 (2010-09-29), [online], September 2010, Ericsson AB, Huawei Technologies Co. Ltd, NEC Corporation, Alcatel Lucent and Nokia Siemens Networks GmbH & Co. KG, [retrieved on Oct. 20, 2011], Internet <URL:http://www.cpri.info/spec.html>

SUMMARY OF INVENTION

Technical Problem

It is predicted that as the traffic (user data) to be processed by the radio base station increases, the traffic between the REC and the RE also increases. However, in the separated structure disclosed in Patent Literature 1 and Non-Patent Literature 1, the REC performs digital signal processing (channel coding, modulation, spreading, generation of an OFDM signal, etc.) on the physical layer. The channel coding, spreading, and the like increase the redundancy of transmitted data. Accordingly, the data amount of a transmitted data stream obtained by performing the digital signal processing on the physical layer is generally larger than that of a data stream before performing the digital signal processing. For this reason, in the separated structure disclosed in Patent Literature 1 and Non-Patent Literature 1, traffic congestion in a communication line between the REC and the RE may occur due to an increase in traffic in the future.

Therefore, it is an object of the present invention to provide a radio station having a separated structure and a method of processing user data capable of easily dealing with an increase in traffic between the REC and the RE.

Solution to Problem

A first aspect of the present invention includes a radio station that is used in a radio communication network and is capable of transmitting and receiving user data including downlink user data and uplink user data to and from a plurality of mobile stations via an air interface. The radio station includes a first part and at least one second part that can be arranged so as to be physically separated from the first part and is connected to the first part via a transmission line so as to be able to communicate with the first part.

The first part includes a first bearer termination unit capable of terminating at least one bearer between an upper network and the radio station.

The second part includes a digital physical layer unit that performs digital physical layer signal processing. The digital physical layer signal processing includes channel coding for transmitting, to the air interface, the downlink user data pertaining to a first mobile station connected to the second part among the plurality of mobile stations, and channel decoding for restoring the uplink user data pertaining to the first mobile station from a signal received from the air interface.

A second aspect of the present invention includes a method of processing user data performed by a radio station. The radio station is used in a radio communication network and is configured to transmit and receive user data including downlink user data and uplink user data to and from a plurality of mobile stations via an air interface. The radio station includes a first part and at least one second part that can be arranged so as to be physically separated from the first part and is connected to the first part via a transmission line so as to be able to communicate with the first part. The processing method according to the second aspect includes:

(A) terminating, in the first part, at least one bearer between an upper network and the radio station; and
(B) performing, in the second part, digital physical layer signal processing including channel coding for transmitting, to the air interface, the downlink user data pertaining to a first mobile station connected to the second part among the plurality of mobile stations, and channel decoding for restoring the uplink user data pertaining to the first mobile station from a signal received from the air interface.

Advantageous Effects of Invention

According to the above-mentioned aspects of the present invention, it is possible to provide a radio station having a separated structure and a method of processing user data capable of easily dealing with an increase in traffic between the REC and the RE.

DESCRIPTION OF EMBODIMENTS

Figure 1:
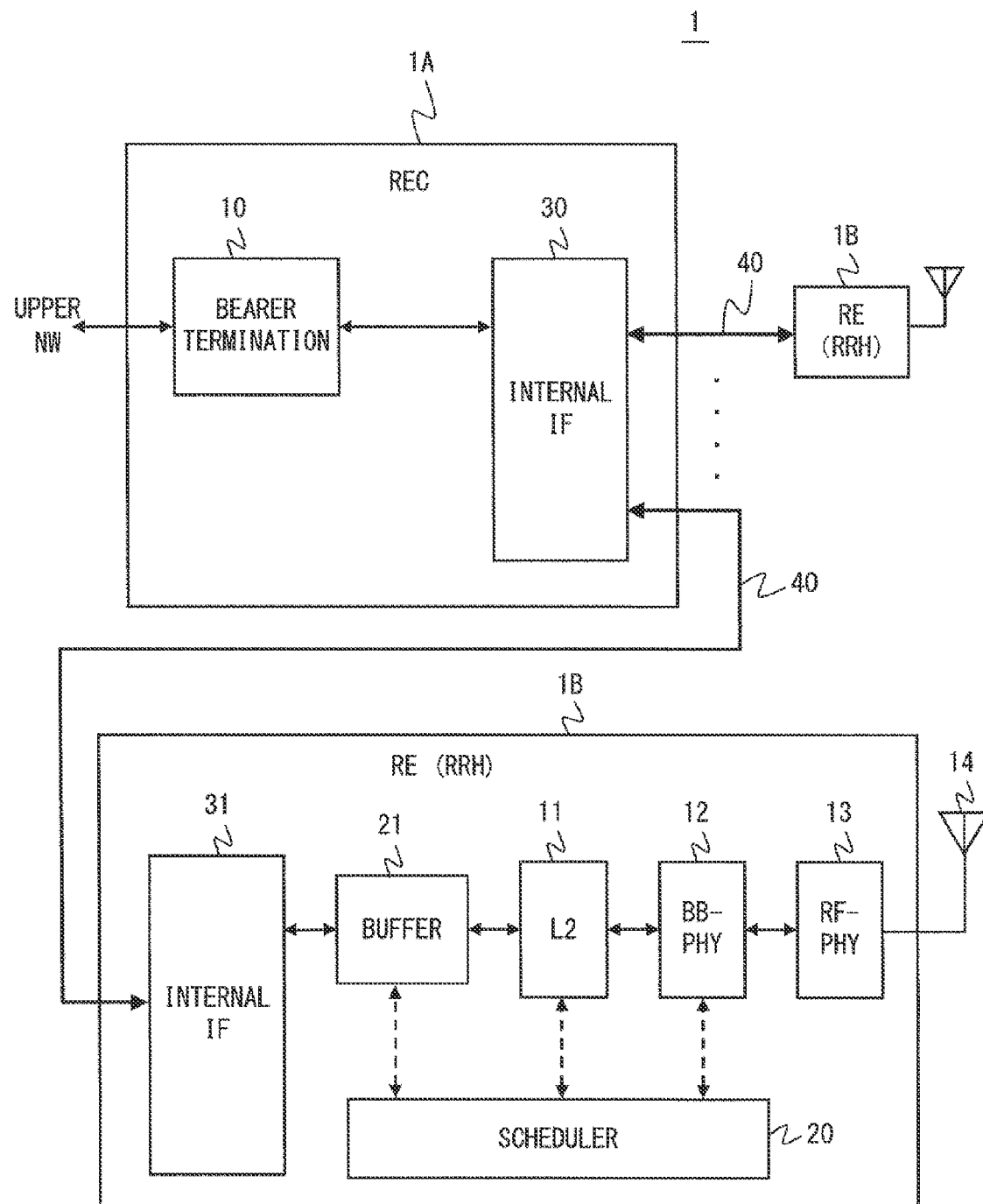
FIG. 1 is a block diagram showing a configuration example of a radio base station according to a first embodiment of the invention.

Specific embodiments of the present invention will be described in detail below with reference to the drawings. The same or corresponding components are denoted by the same reference numerals throughout the drawings, and a repeated description thereof is omitted as needed to clarify the explanation. In the following description, E-UTRA/LTE (Long Term Evolution) radio base stations will be mainly described. However, such a specific radio communication system is described not to limit the scope of the present invention, but to facilitate understanding of the present invention. In other words, those skilled in the art can apply the principle and idea grasped from the embodiments described in detail below to various radio communication systems.

First Embodiment

FIG. 1 is a block diagram showing a configuration of a radio base station 1 according to this embodiment. The radio base station 1 is used in a radio communication network and is capable of transmitting and receiving user data including downlink user data and uplink user data to and from a plurality of mobile stations via an air interface. The radio base station 1 includes a first part, i.e., a radio equipment controller (REC) 1A, and at least one second part, i.e., a radio equipment (RE) 1B. The RE 1B can be arranged so as to be physically separated from the REC 1A via a transmission line 40, and is connected to the REC 1A via the transmission line 40 so as to be able to communicate with the REC 1A. The transmission line 40 may be an electrical transmission line or an optical transmission line. Alternatively, the transmission line 40 may be a point-to-point type radio transmission line (e.g., a microwave radio transmission line). The transmission line 40 may include a plurality of physical transmission lines for bidirectional transmission. As shown in FIG. 1, a plurality of REs 1B may be connected to the REC 1A.

Internal interfaces 30 and 31, which are arranged in the REC 1A and the RE 1B, respectively, have layer-2 and layer-1 functions for bidirectional communication via the transmission line 40. The internal interface 30 may be an electrical interface, an optical interface, or a radio interface. For example, an existing transceiver, such as 1000BASE-CX, 1000BASE-SX, 1000BASE-LX, 10GBASE-LX4, or a fibre channel, may be used as the internal interface 30.

The REC 1A includes a bearer termination unit 10. The bearer termination unit 10 terminates a bearer established between the radio base station and an upper network (e.g., RNC of UMTS, EPC of E-UTRA) so as to transfer user data. In general, a bearer (e.g., an S1 bearer of E-UTRA) for transferring user data is encrypted with a tunneling protocol (e.g., IPsec). A bearer is established for each data flow (e.g., a Packet Data Network (PDN) connection of E-UTRA) between each mobile station and an external network. Accordingly, the bearer termination unit 10 terminates at least one encrypted bearer, receives the downlink user data pertaining to the plurality of mobile stations from the upper network, and sends the uplink user data pertaining to the plurality of mobile stations to the upper network.

On the other hand, the RE 1B includes a scheduler 20, a BB-PHY unit 12, and an RF-PHY unit 13. The scheduler 20 performs dynamic scheduling for the downlink and uplink of each mobile station connected to the RE 1B among the plurality of mobile stations that connect the air interface to the radio base station 1. In other words, the scheduler 20 dynamically allocates a plurality of downlink and uplink radio resources to mobile stations connected to the RE 1B or the user data pertaining to these mobile stations. The radio resources are distinguished by time, frequency, or spreading code, or a combination thereof. For example, in the case of E-UTRA, dynamic scheduling is performed assuming that each radio resource is a resource block and two resource blocks within one sub-frame (1 msec) are defined as a minimum unit. One resource block includes 12 subcarriers in a frequency domain, and includes seven OFDM symbols in a time domain.

The dynamic scheduling for the downlink is achieved by selecting data to be allocated to each radio resource from a buffer 21, by using a scheduling technique such as Proportional Fairness (PF), max-C/I (carrier/interference), or round robin. The buffer 21 temporarily stores the downlink user data which has arrived from the upper network. The buffer 21 is prepared, for example, for each mobile station, for each bearer, for each QoS class, or for each mobile station and each QoS class. The unit in which the buffer 21 is prepared is determined as appropriate depending on the layout of the buffer, requirements for scheduling (e.g., the presence or absence of a QoS class, the necessity to secure a transmission rate), or the like. In addition, there is a degree of freedom in the layout of the buffer 21, and thus the layout of the buffer 21 is not limited to the layout shown in FIG. 1.

The dynamic scheduling for the uplink is performed based on, for example, the reception of a resource allocation request from a mobile station, or a monitoring result of a data buffer arranged in the mobile station. The dynamic scheduling for the uplink is achieved by determining mobile stations to be allocated to radio resources, by using a scheduling technique such as PF, max-C/I, or round robin.

Further, in the case of E-UTRA, as a specific example, the dynamic scheduling performed by the scheduler 20 includes selection of a payload in a radio link control (RLC) sublayer, control of re-transmission in a MAC sublayer, and designation of a coding rate, a modulation scheme and a radio resource in a physical layer. Control information relating to the dynamic scheduling are sent to a layer-2 unit 11 and the BB-PHY unit 12 by signaling as indicated by dashed lines in FIG. 1.

The scheduler 20 arranged in the RE 1B may perform only a part of the dynamic scheduling for mobile stations connected to the RE 1B, instead of performing the whole dynamic scheduling. In this case, the remaining dynamic scheduling may be performed by a primary scheduler (not shown) which is arranged in the REC 1A. For example, the primary scheduler of the REC 1A may determine a range of radio resources that can be allocated to mobile stations connected to the RE 1B. In this case, the scheduler 20 of the RE 1B may dynamically allocate resources to the mobile stations from the range of radio resources determined by the primary scheduler. Alternatively, for example, the primary scheduler of the REC 1A may perform the dynamic scheduling except for hybrid-ARQ (automatic repeat request) re-transmission, and the scheduler 20 of the RE 1B may perform scheduling for H-ARQ re-transmission. Furthermore, the scheduler 20 may calculate a parameter used for dynamic scheduling based on the radio communication quality of the air interface, and may send the parameter to the primary scheduler of the REC 1A. In this case, the primary scheduler 20 of the REC 1A may perform dynamic scheduling by using the parameter calculated by the scheduler 20 of the RE 1B.

The BB-PHY unit 12 performs digital baseband signal processing on the physical layer. More specifically, the signal processing performed by the BB-PHY unit 12 includes channel coding and modulation for transmitting the downlink user data to the air interface. The signal processing performed by the BB-PHY unit 12 also includes demodulation and channel decoding for restoring the uplink user data from the signal received from the air interface. The channel coding and decoding by the BB-PHY unit 12 includes, for example, block coding or convolutional coding, or a combination thereof. The channel coding and decoding by the BB-PHY unit 12 are performed by using, for example, a coding algorithm such as turbo code, Viterbi code, or Reed-Solomon code. Depending on the communication system, the signal processing performed by the BB-PHY unit 12 may include, for example, spreading/despreading, resource mapping, and generation of an OFDM signal involving Inverse Fast Fourier Transform (IFFT).

The RF-PHY unit 13 is connected to an antenna 14, and performs analog RF signal processing on the physical layer. The signal processing performed by the RF-PHY unit 13 includes D/A conversion, A/D conversion, frequency up-conversion, frequency down-conversion, and amplification.

As described above, in the radio base station 1 according to this embodiment, the bearer termination unit 10 is arranged in the REC 1A, and the scheduler 20 and the BB-PHY unit 12 are arranged in the RE 1B. In other words, in the radio base station 1, the RE 1B performs digital signal processing on the physical layer, including at least channel coding and decoding. Thus, since the data stream that contains the user data and is transmitted via the transmission line 40 does not include redundant data generated as a result of channel coding (e.g., block coding, convolutional coding, or turbo coding), the data amount to be transmitted between the REC 1A and the RE 1B can be suppressed. Therefore, the radio base station 1 has an advantage of being able to easily deal with an increase in traffic, as compared with the case of performing channel coding and decoding in the REC.

Further, the scheduler 20 arranged in the RE 1B performs at least a part of the dynamic scheduling for mobile stations connected to the RE 1B. Accordingly, the transmission and reception of the user data and control data relating to the dynamic scheduling between the REC and the RE can be suppressed as compared with the case of performing the whole dynamic scheduling at the REC 1A. Therefore, the radio base station 1 has an advantage of being able to easily deal with an increase in traffic, as compared with the case of performing the whole dynamic scheduling at the REC 1A.

The layout of the layer-2 unit 11 and sub-units included in the layer-2 unit 11 can be modified in various manners. In other words, layer-2 processing functions can be appropriately distributed between the REC 1A and the RE 1B. Various additional effects can be obtained by adjusting the layout of these functional units. Various aspects of the layout of these functional units will be described later in this embodiment and other embodiments.

A layout example of the functional units shown in FIG. 1 will be described in detail below. In the example of FIG. 1, the layer-2 unit 11 is arranged in the RE 1B. The layer-2 unit 11 performs layer-2 signal processing except for dynamic scheduling, utilizing the bearer termination unit 10 as an upper protocol layer and the BB-PHY unit 12 as a lower protocol layer. The layer-2 signal processing includes at least one of (i) data compression/de-compression, (ii) data encryption, (iii) addition/removal of a layer-2 header, data segmentation/concatenation, and (v) composition/decomposition of a transfer format by data multiplexing/de-multiplexing.

In the case of E-UTRA, as a specific example, the layer-2 signal processing includes processing of the RLC sublayer and the MAC sublayer. The RLC sublayer uses the bearer termination unit 10 as an upper protocol layer. In the MAC sublayer, the RLC sublayer is defined as an upper protocol layer, and the BB-PHY unit 12 is defined as a lower protocol layer. The E-UTRA further includes a PDCP sublayer as an upper sublayer of the RLC sublayer. However, processing (e.g., IP header compression, encryption) in the PDCP sublayer is not essential and may be omitted.

In the case of E-UTRA, the PDCP sublayer plays a role in performing processing for reducing the data amount to be transmitted in a manner suitable for the transmission and reception via the air interface. Specifically, the PDCP sublayer performs IP header compression for the downlink user data, and IP header de-compression for the uplink user data. The PDCP sublayer also performs encryption of the user data, and duplication and transfer of the user data so as to reduce a delay in handover.

The RLC sublayer of the E-UTRA performs segmentation and concatenation and re-transmission control for radio bearer data (PDCP Protocol Data Units (PDUs)) supplied from the PDCP sublayer. The RLC sublayer provides, to the PDCP sublayer, a data transfer service using a radio bearer. The RLC sublayer is connected to the MAC sublayer through a logical channel (RLC PDUs).

The MAC sublayer of the E-UTRA performs multiplexing of the logical channels (RLC PDUs), and hybrid-ARQ re-transmission. The MAC sublayer generates a transport channel by multiplexing the logical channels (RLC PDUs). The transmission format (data block size) of the transport channel depends on an instantaneous data rate. The MAC sublayer is connected to the physical layer (the BB-PHY unit 12) through the transport channel (MAC PDUs).

As described above, the layout of the layer-2 unit 12 shown in FIG. 1 is illustrated by way of example, and is not limited to this layout. For example, the whole or a part (e.g., PDCP sublayer) of the layer-2 unit 12 may be arranged in the REC 1A. The dynamic scheduling performed by the scheduler 20 of the RE 1B may be a part of the dynamic scheduling for mobile stations connected to the RE 1B. Such modified examples will be described in the second and subsequent embodiments.

In the example of FIG. 1, the buffer 21 is arranged between the bearer termination unit 10 and the layer-2 unit 11. Accordingly, the buffer 21 stores the user data (e.g., IP packets) itself before performing data compression, encryption, segmentation and multiplexing in the layer-2 processing. However, such a layout of the buffer 21 is illustrated by way of example only. The buffer 21 may be arranged so as to store the user data stream obtained by performing the data compression and encryption in the layer-2. In the case of E-UTRA, the user data stream obtained by performing the data compression and encryption in the layer-2 corresponds to the PDCP Protocol Data Units (PDUs), which are a data stream obtained after the PDCP sublayer is processed (i.e., radio bearer data). Alternatively, the buffer 21 may be arranged so as to store the user data stream obtained by performing segmentation/concatenation and addition of a layer-2 header in the layer-2. In the case of E-UTRA, the user data stream obtained by performing the segmentation/concatenation and addition of a layer-2 header corresponds to the RLC PDUs, which are a data stream obtained after the Radio-Link Control (RLC) sublayer is processed (i.e., a logical channel).

As a modification of the layout of the buffer 21, the buffer 21 may be arranged in the REC 1A. For example, the buffer 21 may be arranged between the bearer termination unit 10 and the internal interface 30 shown in FIG. 1. Modified examples related to the layout of the buffer 21 will be described in the second and subsequent embodiments.

Figure 2:
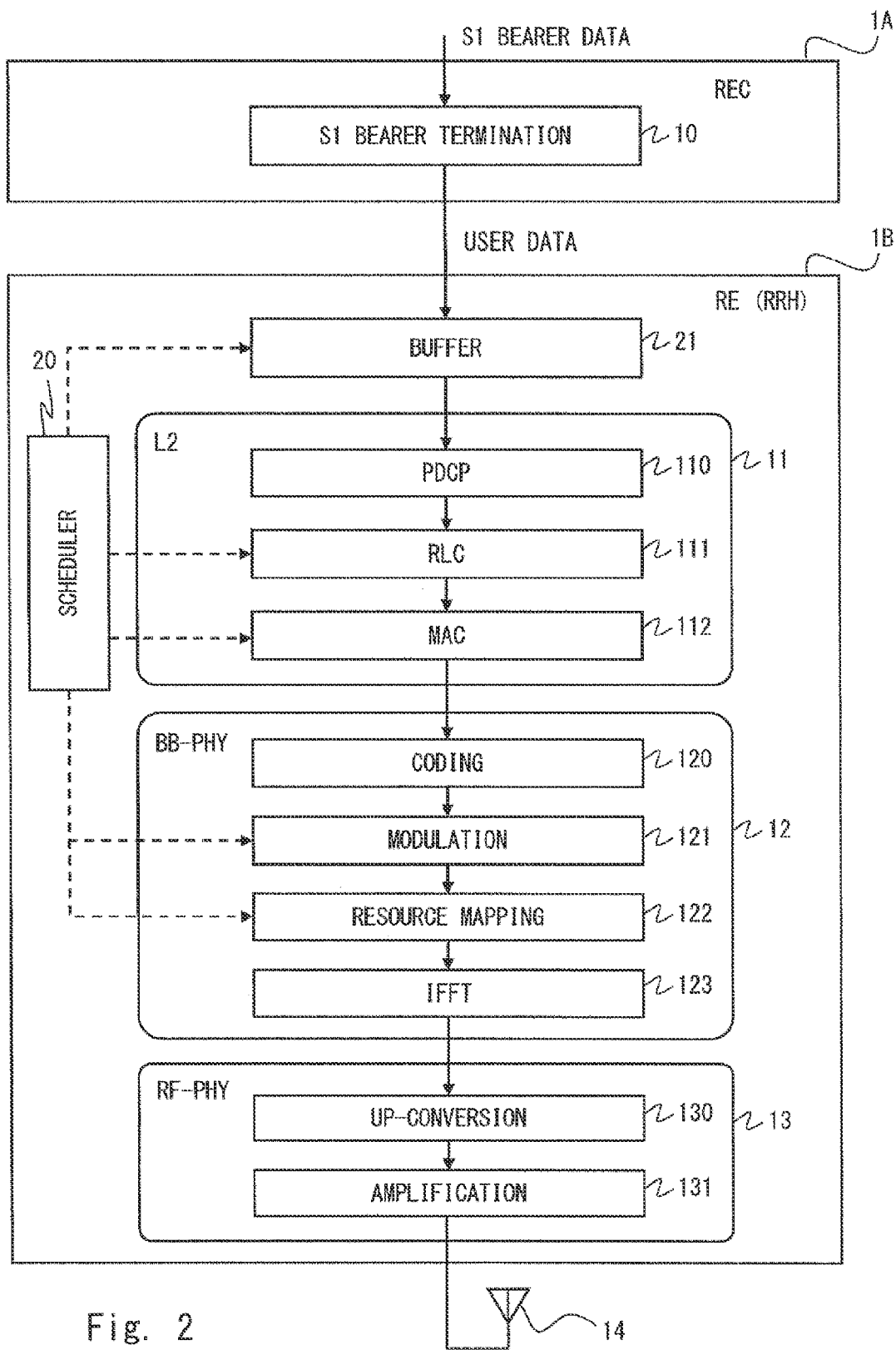
FIG. 2 is a diagram showing a protocol structure and a functional layout of the radio base station according to the first embodiment of the invention.

FIG. 2 shows the details of the functional layout in the radio base station 1 regarding the downlink transmission of user data in the E-UTRA. The functional layout shown in FIG. 2 corresponds to a specific example of the functional layout shown in FIG. 1. For example, the layer-2 unit 11 includes three sub-units, i.e., a PDCP unit 110, an RLC unit 111, and a MAC unit 112. The PDCP unit 110 performs processing on the PDCP sublayer. The RLC unit 111 performs processing on the RLC sublayer. The MAC unit 112 performs processing on the MAC sublayer. The BB-PHY unit 12 includes a coding unit 120, a modulation unit 121, a resource mapping unit 122, and an IFFT unit 123. The RF-PHY unit 13 includes an up-converter 130 and an amplifier 131.

Second Embodiment

Figure 3:
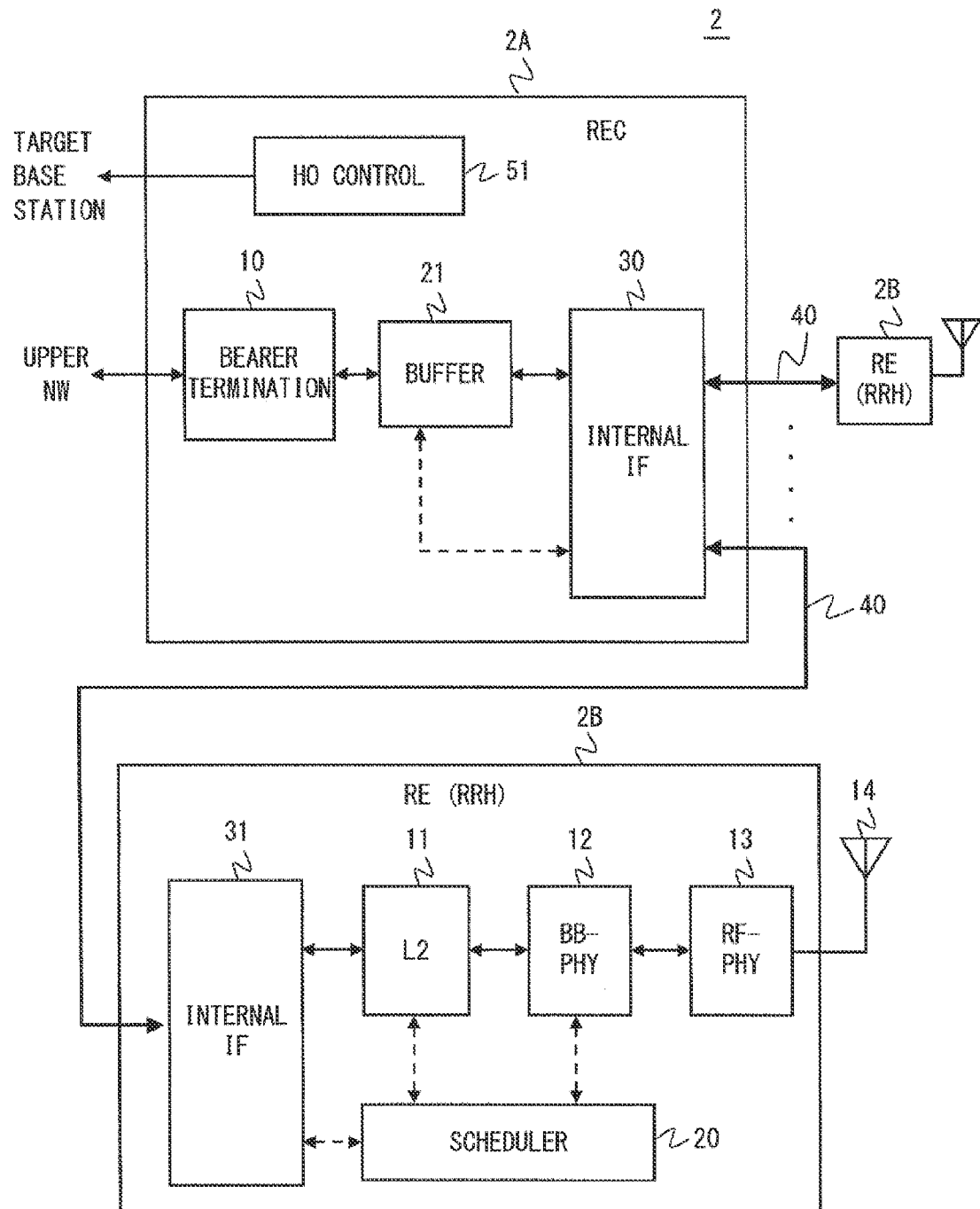
FIG. 3 is a block diagram showing a configuration example of a radio base station according to a second embodiment of the invention.

FIG. 3 is a block diagram showing a configuration example of a radio base station 2 according to this embodiment. The radio base station 2 includes a first part, i.e., a radio equipment controller (REC) 2A, and at least one second part, i.e., a radio equipment (RE) 2B. In this embodiment, a configuration example in which the REC 2A includes the buffer 21 will be described. The buffer 21 shown in FIG. 2 may store the user data (e.g., IP packets) itself before performing data compression, encryption, segmentation and multiplexing in the layer-2 processing. The buffer 21 is arranged in the REC 2A, thereby obtaining an advantage in terms of handover of a mobile station.

In the configuration example of FIG. 3, the REC 2A includes an HO control unit 51. When a mobile station communicating over an air interface performs handover to another base station (target base station), the HO control unit 51 transfers the downlink user data pertaining to the mobile station held in the buffer 21, or the data stream including the downlink user data, to the target base station. The transfer of the user data to the target base station is performed in the same manner as in a typical handover procedure. Specifically, the user data may be transferred to the target base station by using an interface (e.g., an X2 interface) available between base stations, or may be transferred via an upper network.

In FIG. 3, the REC 2A may be configured to perform processing (e.g., IP header compression, encryption) on the PDCP sublayer at the bearer termination unit 10. In other words, the PDCP sub-unit 110 may be arranged in the REC 2A. In this case, the layer-2 unit 11 may perform other layer-2 processing (i.e., processing of RLC and MAC sublayers) except for the PDCP sublayer. In this case, the buffer 21 may store PDCP PDUs for each mobile station, for each bearer, for each QoS class, or for each mobile station and each QoS class. The entire layer-2 unit 11 may be arranged in the REC 2A.

In the configuration example shown in FIG. 3, the REC 2A buffers the user data or the data stream (e.g., PDCP PDUs) containing the user data, thereby facilitating the data transfer to the target base station during the handover. In other words, there is no need to transfer the data from the RE 2B to the REC 2A during the handover. When a mobile station moves between REs 2B connected to the REC 2A, it is only necessary for the REC 2A to change the transmission destination of the buffered user data or the data stream (e.g., PDCP PDUs) containing the user data to the RE 2B as the handover target. This makes it possible to easily provide continuous services by following the movement of a mobile station.

Figure 4:
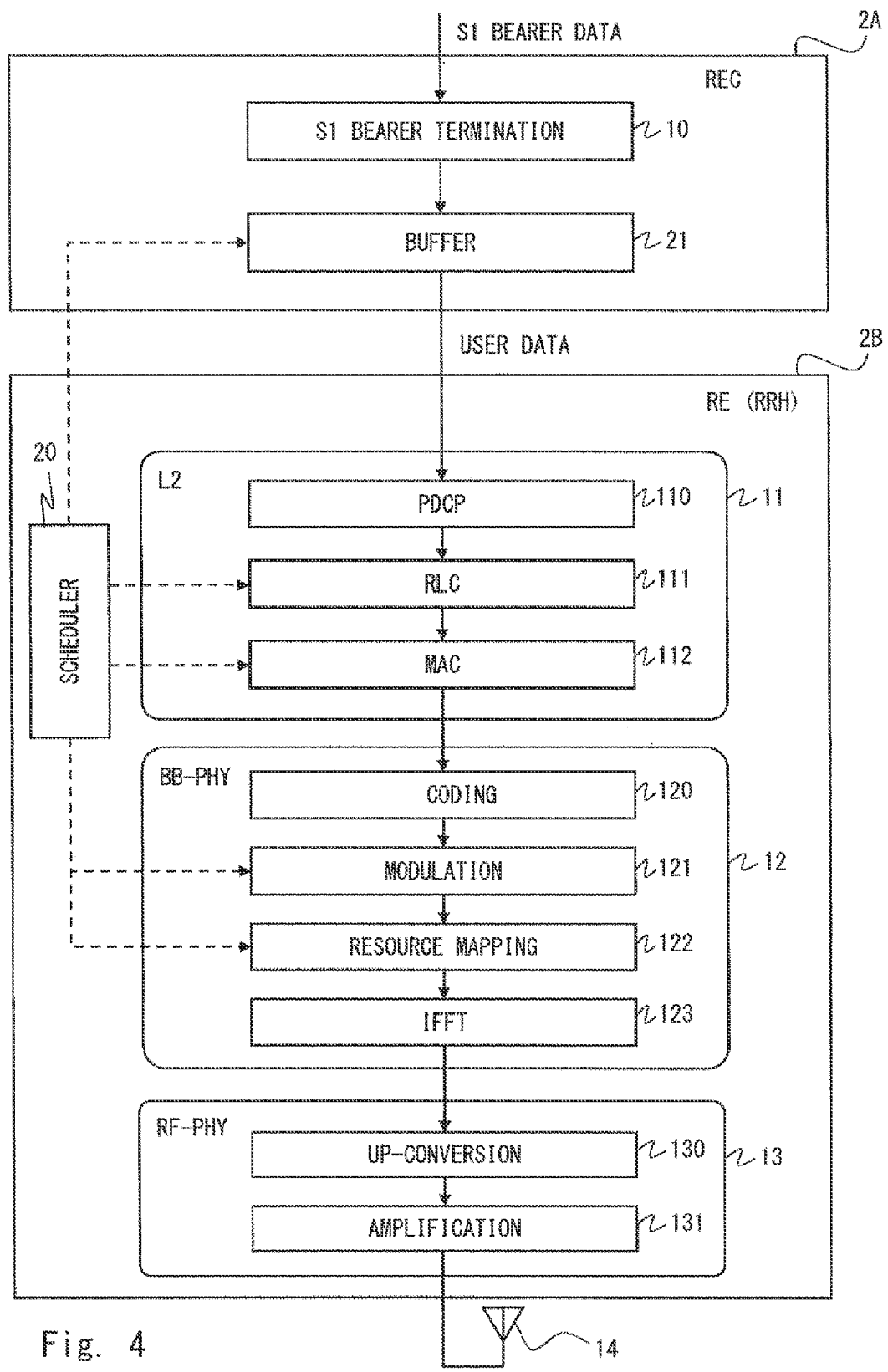
FIG. 4 is a diagram showing a protocol structure and a functional layout of the radio base station according to the second embodiment of the invention.

FIG. 4 shows the details of the functional layout in the radio base station 1 regarding the downlink transmission of user data in the E-UTRA. The functional layout shown in FIG. 4 corresponds to a specific example of the functional layout shown in FIG. 3. In the example of FIG. 4, the scheduler 20 of the RE 2B may control the buffer 21 via the transmission line 40.

Third Embodiment

Figure 5:
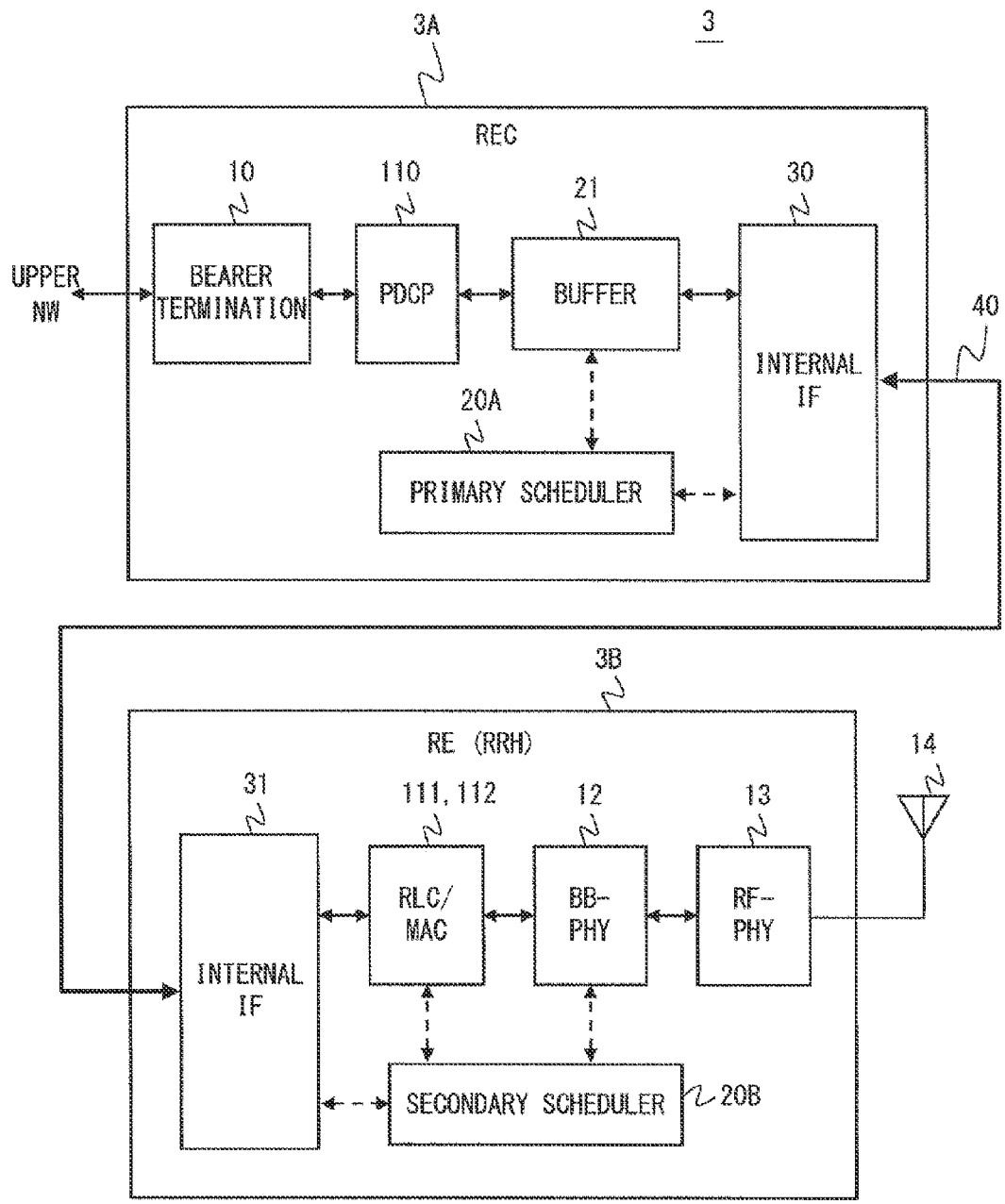
FIG. 5 is a block diagram showing a configuration example of a radio base station according to a third embodiment of the invention.

FIG. 5 is a block diagram showing a configuration example of a radio base station 3 according to this embodiment. The radio base station 3 includes a first part, i.e., a radio equipment controller (REC) 3A, and at least one second part, i.e., a radio equipment (RE) 3B. Though only one RE 3B is illustrated in FIG. 5, a plurality of REs 3B may be connected to the REC 3A as shown in FIG. 1. In the configuration example of FIG. 5, the PDCP unit 110 is arranged in the REC 3A. In the configuration example of FIG. 5, the REC 3A includes a primary scheduler 20A, and the RE 3B includes a secondary scheduler 20B. In this embodiment, the secondary scheduler 20B of the RE 3B performs a part of the dynamic scheduling for mobile stations connected to the RE 3B. The secondary scheduler 20B operates in a cooperative manner with the primary scheduler 20A for the dynamic scheduling. Specific examples of dividing the functions between the primary scheduler 20A and the secondary scheduler 20B will be described.

In a first example, the secondary scheduler 20B calculates a parameter used for dynamic scheduling based on the radio communication quality of the air interface, and sends the parameter to the primary scheduler 20A. The primary scheduler 20A performs dynamic scheduling for mobile stations connected to the RE 3B, by using the parameter received from the secondary scheduler 20B. Main scheduling techniques, such as PF scheduling and Max-C/I scheduling, use the radio communication quality of the air interface. For example, PF scheduling uses, as a parameter, a ratio between an instantaneous predicted radio communication quality and a previous average radio communication quality of a mobile station so as to secure the fairness of transmission opportunities among mobile stations. This parameter is called a PF metric. Examples of the radio communication quality used for calculation of the PF metric include a data rate and a signal-to-interference ratio (SINR). The PF metric is calculated as, for example, a ratio between an instantaneous SINR and an average SINR (i.e., instantaneous SINR/average SINR).

The secondary scheduler 20B calculates a parameter, such as the PF metric, using the radio communication quality, thereby reducing the processing load of the primary scheduler 20A. Further, the data amount to be transmitted from the RE 3B to the REC 3A via the transmission line 40 can be reduced. In the case of calculating a parameter (e.g., PF metric) in the REC 3A, it is necessary to send the measurement results of the current and previous radio communication qualities to the REC 3A from the RE 3B. However, when the secondary scheduler 20B calculates a parameter, only the calculated parameter may be sent instead of the measurement results of the current and previous radio communication qualities.

Figure 6:
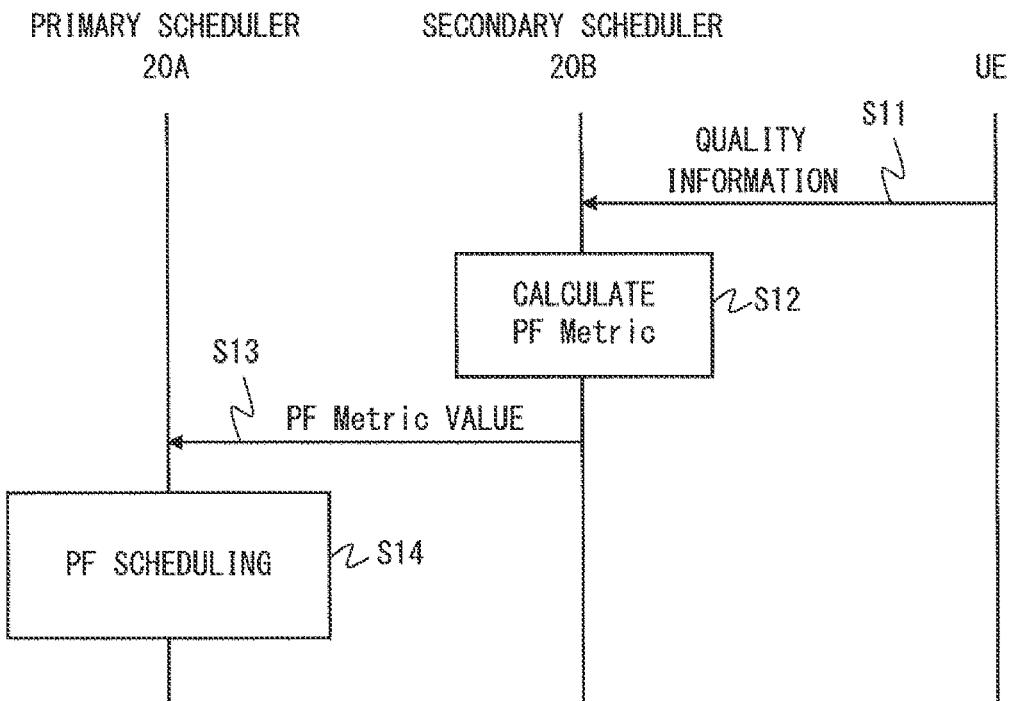
FIG. 6 is a sequence diagram showing operation examples of a primary scheduler and a secondary scheduler according to the third embodiment of the invention.

FIG. 6 is a sequence diagram showing operations of the primary scheduler 20A and the secondary scheduler 20B when the secondary scheduler 20B calculates the PF metric. In step S11, a mobile station (UE) sends quality information. This quality information indicates the downlink radio communication quality measured by the mobile station. In step S12, the secondary scheduler 20B calculates the PF metric by using the quality information received from the mobile station. In step S13, the secondary scheduler 20B sends the PF metric to the primary scheduler 20A. In step S14, the primary scheduler 20A executes dynamic scheduling by using the PF metric received from the secondary scheduler 20B, and determines mobile stations or user data to be allocated to downlink radio resources.

Next, a second example of dividing the functions between the primary scheduler 20A and the secondary scheduler 20B will be described. In the second example, the secondary scheduler 20B executes scheduling for H-ARQ re-transmission or scheduling for re-transmission of the RLC sublayer. Specifically, the secondary scheduler 20B buffers the downlink transmitted data, and when the mobile station requests a re-transmission, the secondary scheduler 20B performs re-transmission based on a re-transmission instruction from the primary scheduler 20A. For example, the secondary scheduler 20B may allocate, for the re-transmission, the same radio resource as that used for the transmission immediately before. This contributes to a reduction in the processing load of the primary scheduler 20A. Further, since there is no need to transfer the re-transmitted data from the REC 3A to the RE 3B, the data amount to be transmitted via the transmission line 40 can be reduced.

Figure 7:
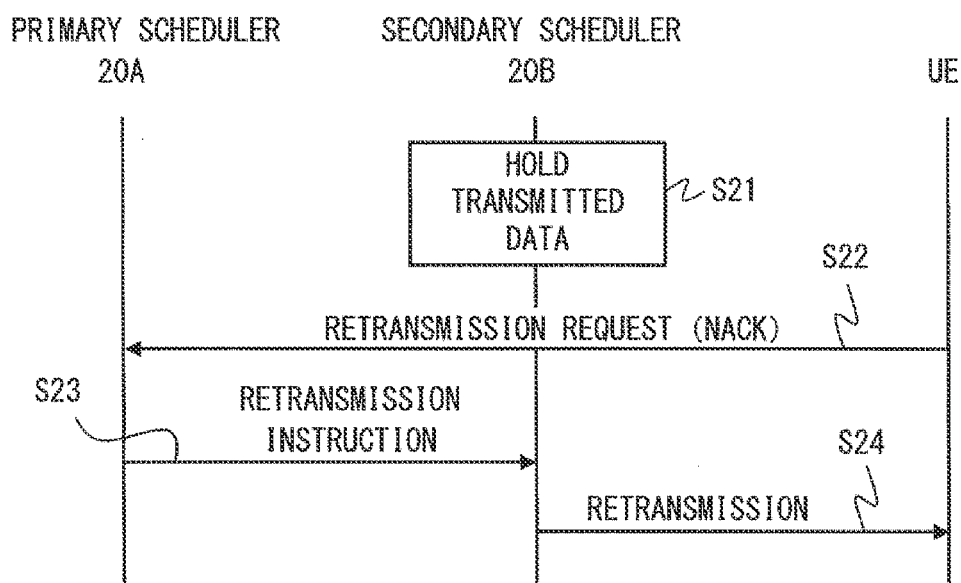
FIG. 7 is a sequence diagram showing operation examples of the primary scheduler and the secondary scheduler according to the third embodiment of the invention.

FIG. 7 is a sequence diagram showing operations of the primary scheduler 20A and the secondary scheduler 20B when the secondary scheduler 20B controls re-transmission. In step S21, the secondary scheduler 20B buffers the downlink transmitted data. In step S22, the mobile station sends a re-transmission request (e.g., NACK), and the primary scheduler 20A receives the re-transmission request. In step S23, the primary scheduler 20A instructs the secondary scheduler 20B to perform re-transmission. In step S24, the secondary scheduler 20B performs re-transmission according to an instruction from the primary scheduler 20A.

As is apparent from the descriptions of the first and second embodiments, the functional layout in the configuration example shown in FIG. 5 is illustrated by way of example only. For example, the PDCP unit 110 may be arranged in the RE 3B. The buffer 21 may be arranged in the RE 3B.

Fourth Embodiment

Figure 8:
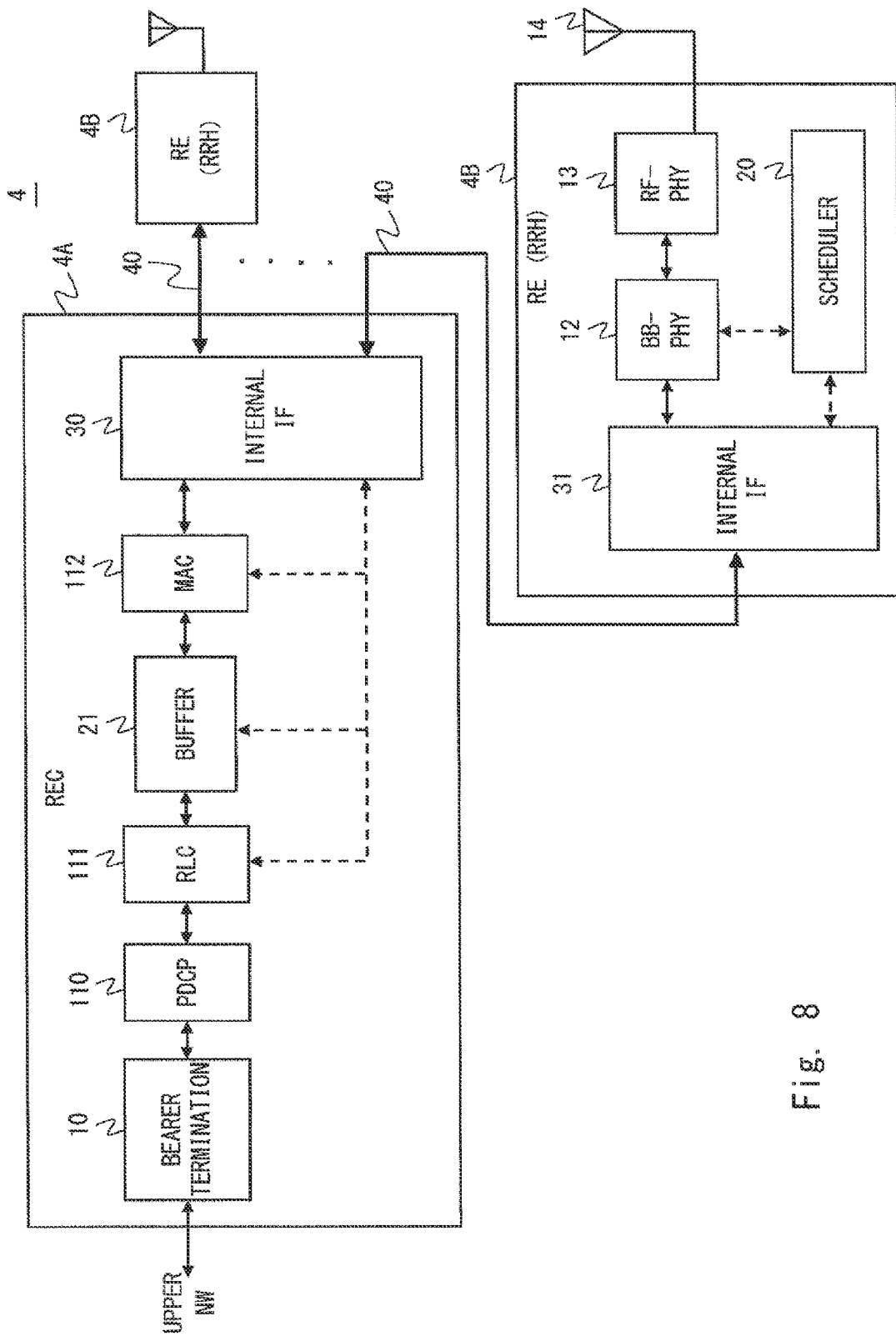
FIG. 8 is a block diagram showing a configuration example of a radio base station according to a fourth embodiment of the invention.

FIG. 8 is a block diagram showing a configuration example of a radio base station 4 according to this embodiment. The radio base station 4 includes a first part, i.e., a radio equipment controller (REC) 4A, and at least one second part, i.e., a radio equipment (RE) 4B. The radio base station 4 differs from the above-described radio base station 1 in that the layer-2 unit 11 is arranged in the REC 4A. In the configuration example of FIG. 8, the PDCP unit 110, the RLC unit 111, and the MAC unit 112 correspond to the layer-2 unit 11.

In the radio base station 4, the scheduler 20 and the BB-PHY unit 12 are arranged in the RE 4B, as in the radio base station 1. Accordingly, the radio base station 4 can suppress the data amount to be transmitted via the transmission line 40, as in the radio base station 1.

Further, since the layer-2 unit 11 is arranged in the REC 4A in the radio base station 4, the digital signal processing can be performed in a distributed manner between the REC 4A and the RE 4B. Furthermore, according to this embodiment, the layer-2 unit 11, which is arranged in the REC 4A, can be shared for processing of the user data pertaining to a plurality of REs 4B. Therefore, the layer-2 unit 11 can be effectively used.

Figure 9:
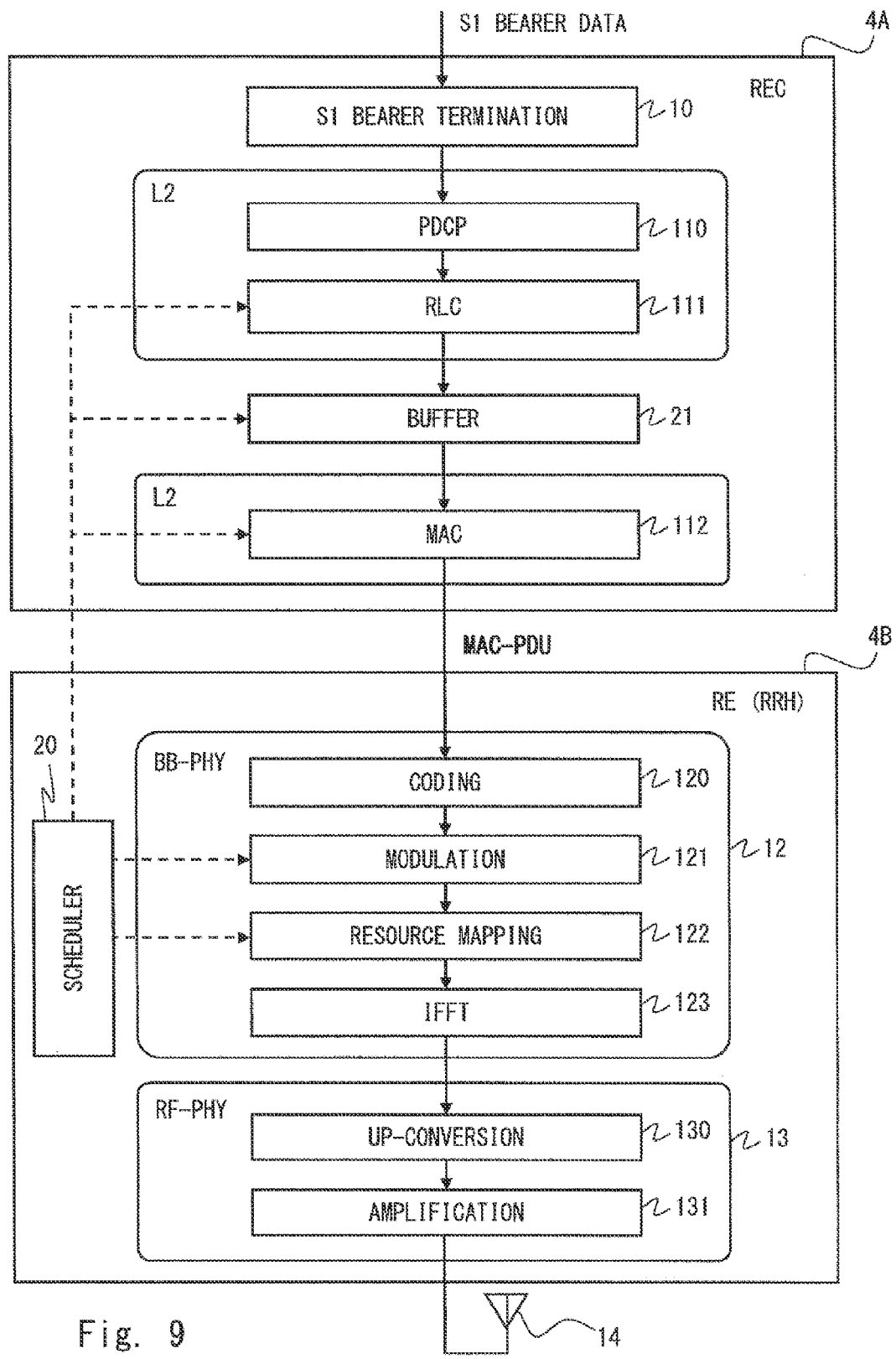
FIG. 9 is a diagram showing a protocol structure and a functional layout of the radio base station according to the fourth embodiment of the invention.

FIG. 9 shows the details of the functional layout in the radio base station 4 regarding the downlink transmission of user data in the E-UTRA. As described above, in this embodiment, the layer-2 unit 11 is arranged in the REC 4A. Accordingly, MAC-PDUs (i.e., a transport channel) are transferred from the REC 7A to the RE 7B.

In the example shown in FIGS. 8 and 9, the buffer 21 is arranged between the RLC unit 111 and the MAC unit 112. Accordingly, the buffer 21 shown in FIGS. 8 and 9 may store RLC PDUs (i.e., a logical channel) for each mobile station, for each bearer, for each QoS class, or for each mobile station and each QoS class. However, as described in detail in the first embodiment, the layout of the buffer 21 can be changed as needed. For example, the buffer 21 may be arranged between the PDCP unit 110 and the RLC unit 111.

Fifth Embodiment

Figure 10:
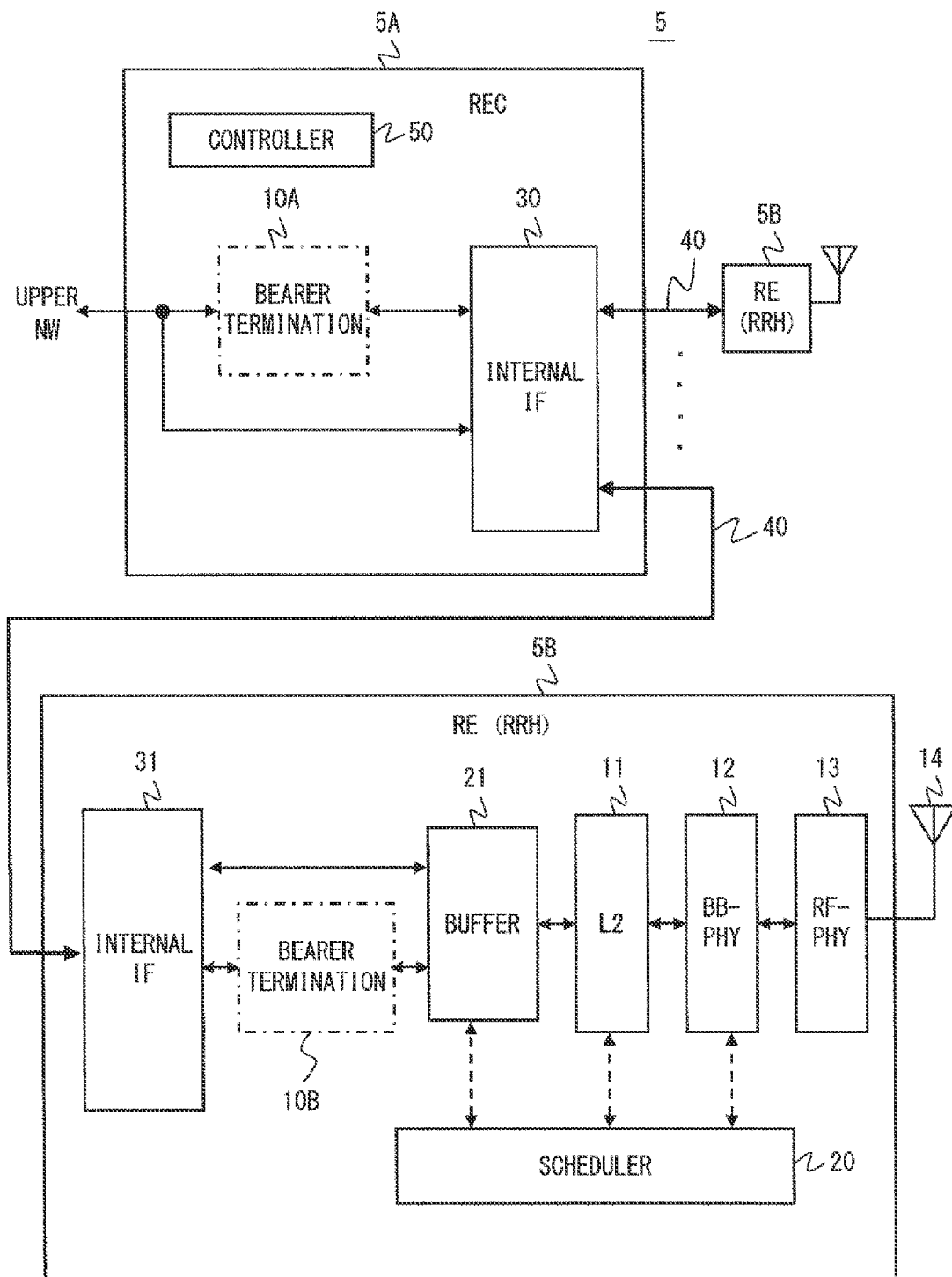
FIG. 10 is a block diagram showing a configuration example of a radio base station according to a fifth embodiment of the invention.

FIG. 10 is a block diagram showing a configuration of a radio base station 5 according to this embodiment. The radio base station 5 includes a first part, i.e., a radio equipment controller (REC) 5A, and at least one second part, i.e., a radio equipment (RE) 5B. The radio base station 5 differs from the above-described radio base station 1 in that bearer termination units 10A and 10B are arranged in the REC 5A and the RE 5B, respectively, and a termination point of at least one bearer (e.g., an S1 bearer) between an upper network and the radio base station 5 is selectable between the REC 5A and the RE 5B. A bearer termination point may be selected for each bearer, or for each cell. Alternatively, bearer termination points may be collectively selected for all bearers terminated in the radio base station 5.

An example of collectively selecting termination points of all bearers terminated in the radio base station 5 will be described below. For example, bearer termination points may be selected based on a security level of the transmission line 40 between the REC 5A and the RE 5B. More specifically, when the security level of the transmission line 40 is relatively high, the bearers may be terminated in the REC 5A, and when the security level of the transmission line 40 is relatively low, the bearers may be terminated in the RE 5B. The case where the security level of the transmission line 40 is relatively high is, for example, when the transmission line 40 is a dedicated line of a telecom carrier, or when the transmission line 40 is laid on the premises managed by the telecom carrier. The case where the security level of the transmission line 40 is relatively low is, for example, when the transmission line 40 is a general public line, or when the transmission line 40 is laid in a place that is not under full control.

Bearer termination points may be selected at the time of setting up the radio base station 5. Alternatively, bearer termination points may be selected according to switching of the transmission line 40, for example, switching between a main transmission line and a backup transmission line. Specifically, a controller 50 of the radio base station 5 may switch the termination points according to the respective security levels of the main transmission line and the backup transmission line when the main transmission line and the backup transmission line have different security levels. Such switching of bearer termination points may be performed according to an instruction from an external device, such as a resource control device or an OAM (Operation Administration and Maintenance) system, which are arranged outside (e.g., an upper network) of the radio base station 5.

Next, an example of individually selecting a termination point for each bearer will be described. For example, a bearer termination point may be selected based on a security level or a QoS class required for each bearer. Specifically, bearers requiring a high security level and bearers to which a high QoS class is set may be terminated in the RE 5B. The other bearers may be terminated in the REC 5A.

In the radio base station 5, as in the radio base station 1, the scheduler 20 and the BB-PHY unit 12 are arranged in the RE 5B. Accordingly, the radio base station 5 can suppress the data amount to be transmitted via the transmission line 40, as in the radio base station 1.

Furthermore, according to this embodiment, the bearer termination in the REC 5A, which contributes to a reduction in the data amount to be transmitted via the transmission line 40, and the bearer termination in the RE 5B, which contributes to an improvement of the security level of the transmission line 40, can be flexibly used depending on the situation.

In the example of FIG. 10, the buffer 21 is arranged in the RE 5B. However, as described in detail in the first embodiment, the layout of the buffer 21 can be changed as needed. For example, the buffer 21 may be arranged in the REC 5A.

Figure 11A:
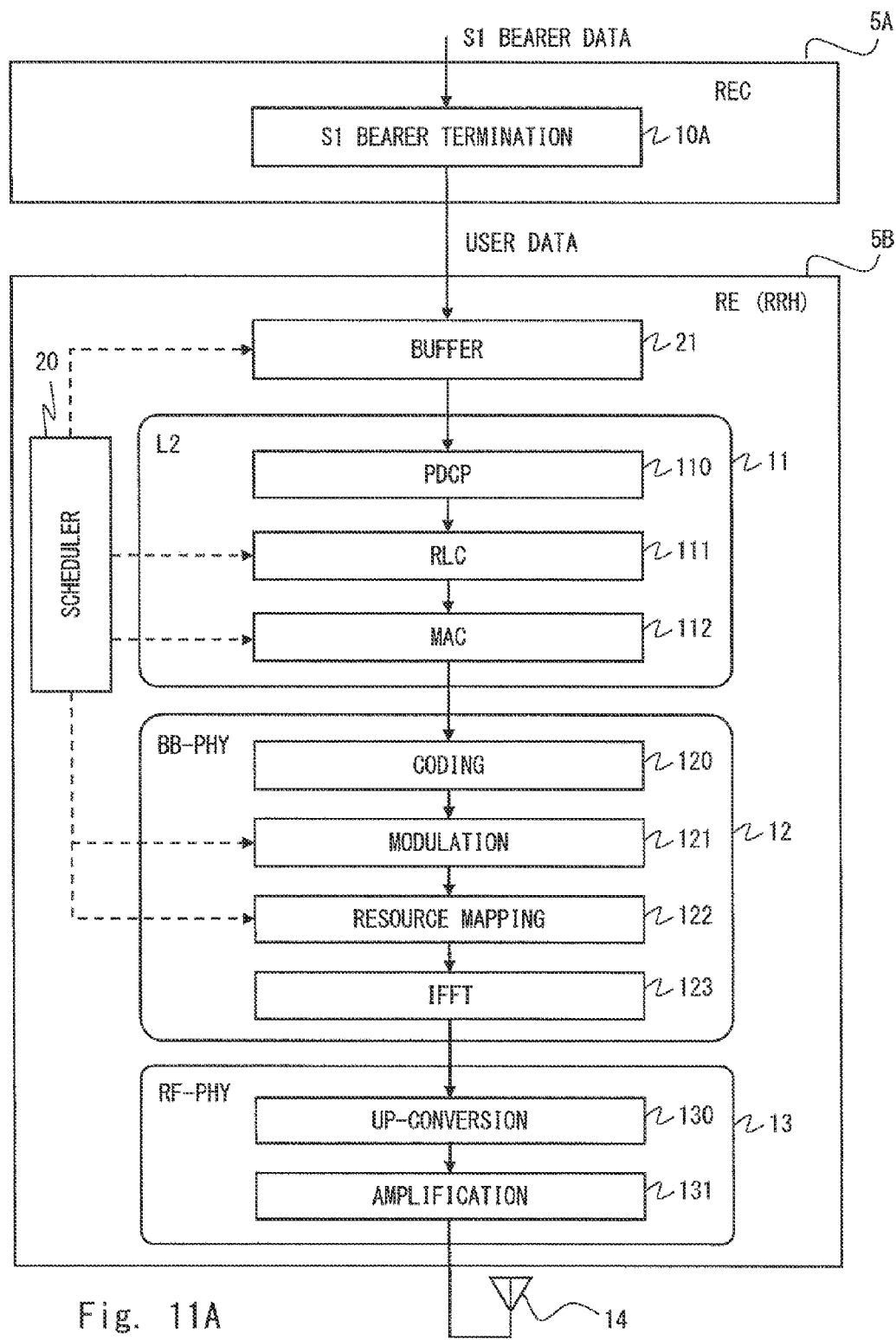
FIG. 11A is a diagram showing a protocol structure and a functional layout of the radio base station according to the fifth embodiment of the invention.
Figure 11B:
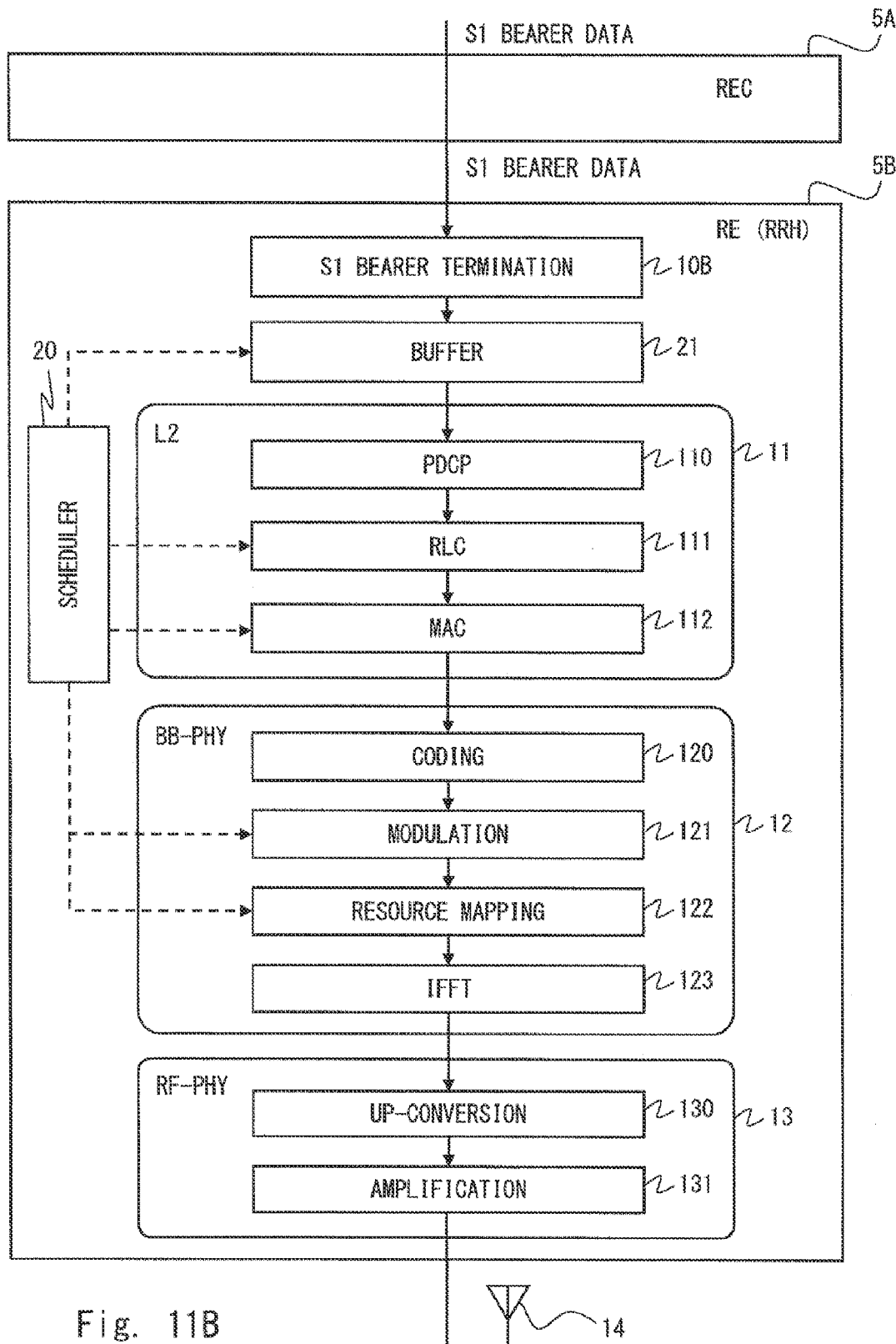
FIG. 11B is a diagram showing a protocol structure and a functional layout of the radio base station according to the fifth embodiment of the invention.

FIGS. 11A and 11B show the details of the functional layout in the radio base station 5 regarding the downlink transmission of user data in the E-UTRA. The functional layout shown in FIG. 11A corresponds to the case where the bearer termination unit 10A of the REC 5A is used in the configuration example of FIG. 10. On the other hand, the functional layout shown in FIG. 11B corresponds to the case where the bearer termination unit 10B of the RE 5B is used. In the example of FIG. 11A, the user data is transferred from the REC 5A to the RE 5B. In the example of FIG. 11B, the encrypted bearer data (e.g., S1 bearer data) is transferred from the REC 5A to the RE 5B.

Other Embodiments

The radio base stations 1 to 5 respectively described in the first to fifth embodiments may be relay stations. The relay station establishes a first radio link (a backhaul link) with a base station and establishes a second radio link (an access link) with a mobile station, thereby relaying data between the base station and the mobile station.

The bearer termination unit, the layer-2 unit, the BB-PHY unit, and the scheduler, which are described in the first to fifth embodiments, may be implemented by using a semiconductor processing device including, for example, an ASIC (Application Specific Integrated Circuit) and a DSP (Digital Signal Processor). These units may be implemented by causing a computer, such as a microprocessor, to execute a program.

This program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a radio communication line.

The first to fifth embodiments can be combined as appropriate. Furthermore, the present invention is not limited to the embodiments described above, and can be modified in various manners without departing from the gist of the invention described above.

This application is based upon and claims the benefit of priority from Japanese patent application No. 2011-257476, filed on Nov. 25, 2011, the disclosure of which is incorporated herein in its entirety by reference.

REFERENCE SIGNS LIST 1-5 Radio Base Stations
1A-5A Radio Equipment Controllers (REC)
1B-5B Radio Equipment (RE)
10, 10A, 10B Bearer Terminal Units
11 Layer-2 Unit
12 BB-PHY Unit
13 RF-PHY Unit
14 Antenna
20 Scheduler
20A Primary Scheduler
20B Secondary Scheduler
21 Buffer
30, 31 Internal Interfaces
40 Transmission Line
50 Controller
51 Handover Control Unit
110 PDCP Unit
111 RLC Unit
112 MAC Unit
120 Coding Unit
121 Modulation Unit
122 Resource Mapping Unit
123 IFFT Unit
130 Up-Converter
131 Amplifier

The invention claimed is:

1. A radio station that is used in a radio communication network and is capable of transmitting and receiving user data including downlink user data and uplink user data to and from a plurality of mobile stations via an air interface, the radio station comprising:
a first part; and
at least one second part that can be arranged so as to be physically separated from the first part, and is connected to the first part via a transmission line so as to be able to communicate with the first part, wherein
the first part comprises a first bearer termination unit capable of terminating at least one bearer between an upper network and the radio station,
the second part comprises a digital physical layer unit configured to perform digital physical layer signal processing, the digital physical layer signal processing includes channel coding for transmitting, to the air interface, the downlink user data pertaining to a first mobile station connected to the second part among the plurality of mobile stations, and channel decoding for restoring the uplink user data pertaining to the first mobile station from a signal received from the air interface,
the first part further comprises a first scheduling unit configured to perform dynamic scheduling to allocate a radio resource to the plurality of mobile stations,
the second part further comprises a second scheduling unit configured to operate in a cooperative manner with the first scheduling unit for the dynamic scheduling, and
the second scheduling unit configured to calculate a parameter used for the dynamic scheduling based on a radio communication quality and send the parameter to the first scheduling unit.

2. The radio station according to claim 1, wherein the second scheduling unit executes scheduling for re-transmission of the downlink user data.

3. The radio station according to claim 1, wherein the second part further comprises an analog physical layer unit configured to perform analog signal processing including at least one of frequency conversion and power amplification in order to provide the air interface to the first mobile station.

4. The radio station according to claim 1, wherein
the second part further comprises a layer-2 unit configured to perform layer-2 signal processing for transmitting the downlink user data pertaining to the first mobile station to the air interface and for restoring the uplink user data pertaining to the first mobile station from the received signal.

5. The radio station according to claim 4, wherein
the layer-2 signal processing includes at least one of: (i) addition of a layer-2 header; (ii) data segmentation/concatenation; and (iii) composition of a transfer format by data multiplexing, so as to transmit the downlink user data to the air interface, and
the layer-2 signal processing includes at least one of: (i) decomposition of a transfer format; (ii) de-segmentation/de-concatenation; and (iii) removal of a layer-2 header, so as to restore the uplink user data.

6. The radio station according to claim 1, wherein
the second part further comprises a second bearer termination unit capable of performing, in place of the first bearer termination unit, termination of a bearer pertaining to the first mobile station among the at least one bearer.

7. The radio station according to claim 6, wherein one of the first and second bearer termination units to be used is selected based on a security level or a QoS class of the user data.

8. The radio station according to claim 6, wherein one of the first and second bearer termination units to be used is selected for each of the user data.

9. The radio station according to claim 6, wherein one of the first and second bearer termination units to be used is selected for each bearer.

10. The radio station according to claim 6, further comprising a control unit configured to determine which one of the first and second bearer termination units is used for termination of a bearer pertaining to the first mobile station.

11. The radio station according to claim 6, wherein the radio station determines which one of the first and second scheduling units is used for termination of a bearer pertaining to the first mobile station, based on an instruction from an external device.

12. The radio station according to claim 1, wherein the radio station is a base station or a relay station.

13. A method of processing user data performed by a radio station, the radio station being used in a radio communication network and configured to transmit and receive user data including downlink user data and uplink user data to and from a plurality of mobile stations via an air interface, the radio station including a first part and at least one second part that can be arranged so as to be physically separated from the first part and is connected to the first part via a transmission line so as to be able to communicate with the first part,
the processing method comprising:
    terminating, in the first part, at least one bearer between an upper network and the radio station;
    performing, in the second part, digital physical layer signal processing including channel coding for transmitting, to the air interface, the downlink user data pertaining to a first mobile station connected to the second part among the plurality of mobile stations, and channel decoding for restoring the uplink user data pertaining to the first mobile station from a signal received from the air interface,
    performing, in the first part, dynamic scheduling to allocate a radio resource to the plurality of mobile stations; and
    performing, in the second part, secondary scheduling in a cooperative manner with the first part for the dynamic scheduling, wherein
    the secondary scheduling includes calculating a parameter used for the dynamic scheduling based on a radio communication quality, and sending the parameter to the first part.

14. The method according to claim 13, wherein the secondary scheduling includes executing scheduling for re-transmission of the downlink user data.

15. The method according to claim 13, further comprising performing, in the second part, analog signal processing including at least one of frequency conversion and power amplification in order to provide the air interface to the first mobile station.

16. The method according to claim 13, further comprising performing, in the second part, layer-2 signal processing for transmitting the downlink user data pertaining to the first mobile station to the air interface and for restoring the uplink user data pertaining to the first mobile station from the received signal.

17. The method according to claim 16, wherein
the layer-2 signal processing includes at least one of: (i) addition of a layer-2 header; (ii) data segmentation/concatenation; and (iii) composition of a transfer format by data multiplexing, so as to transmit the downlink user data to the air interface, and
the layer-2 signal processing includes at least one of: (i) decomposition of a transfer format; (ii) de-segmentation/de-concatenation; and (iii) removal of a layer-2 header, so as to restore the uplink user data.

18. The method according to claim 13, further comprising alternatively using one of the first and second parts to terminate a bearer pertaining to the first mobile station among the at least one bearer.

19. The method according to claim 18, wherein the alternatively using includes selecting one of the first and second parts to be used, based on a security level or a QoS level of the user data.

20. The method according to claim 18, wherein the selecting one of the first and second parts to be used for terminating the bearer pertaining to the first mobile station is performed for each of the user data.

21. The method according to claim 18, wherein the selecting one of the first and second parts to be used for terminating the bearer pertaining to the first mobile station is performed for each bearer.

* * * * *